(12) United States Patent
Taherzadeh Boroujeni et al.

(10) Patent No.: US 12,470,339 B2
(45) Date of Patent: Nov. 11, 2025

(54) DYNAMIC PHASE TRACKING REFERENCE SIGNAL (PTRS) ACTIVATION

(71) Applicant: QUALCOMM Incorporated, San Diego, CA (US)

(72) Inventors: Mahmoud Taherzadeh Boroujeni, San Diego, CA (US); Tao Luo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 192 days.

(21) Appl. No.: 17/394,013

(22) Filed: Aug. 4, 2021

(65) Prior Publication Data
US 2023/0042323 A1  Feb. 9, 2023

(51) Int. Cl.
*H04L 5/00* (2006.01)
*H04W 72/20* (2023.01)

(52) U.S. Cl.
CPC ........... *H04L 5/0048* (2013.01); *H04W 72/20* (2023.01)

(58) Field of Classification Search
CPC .............. H04L 27/3411; H04L 1/0009; H04L 27/2695; H04W 72/0453; H04W 72/0446
See application file for complete search history.

(56) References Cited

U.S. PATENT DOCUMENTS

| | | | |
|---|---|---|---|
| 2018/0205528 A1* | 7/2018 | Bai | H04L 5/0092 |
| 2018/0351719 A1* | 12/2018 | Lee | H04L 5/0053 |
| 2019/0165910 A1* | 5/2019 | Lee | H04L 5/0048 |
| 2019/0215118 A1* | 7/2019 | Molés Cases | H04L 5/0051 |
| 2019/0254020 A1* | 8/2019 | Nam | H04L 5/0051 |
| 2020/0008102 A1* | 1/2020 | Yokomakura | H04L 5/0048 |
| 2020/0280412 A1* | 9/2020 | Qi | H04W 72/0453 |
| 2021/0050965 A1* | 2/2021 | Wu | H04L 5/0051 |

OTHER PUBLICATIONS

International Search Report and Written Opinion—PCT/US2022/038531—ISA/EPO—Oct. 25, 2022.
Qualcomm Incorporated: "Joint Channel Estimation for PUSCH", 3GPP TSG-RAN WG1 Meeting #105e, R1-2104687, 3rd Generation Partnership Project, Mobile Competence Centre, 650, Route Des Lucioles, F-06921 Sophia-Antipolis Cedex, France, vol. RAN WG1, No. e-Meeting, May 10,2021-May 27, 2021, May 12, 2021, XP052010938, 9 Pages.
Samsung: "Summary for WI: Enhancement on MIMO for NR", 3GPP TSG RAN Meeting #90-e, RP-202803, 3rd Generation Partnership Project, Mobile Competence Centre, 650, Route Des Lucioles, F-06921 Sophia-Antipolis Cedex, France, vol. TSG RAN, No. Electronic Meeting, Dec. 7, 2020-Dec. 11, 2020, Dec. 8, 2020, 11 Pages, XP051966038, section 2.

* cited by examiner

*Primary Examiner* — Yee F Lam
(74) *Attorney, Agent, or Firm* — Guang Y. Zhang; Patterson & Sheridan LLP

(57) ABSTRACT

Aspects of the present disclosure can be implemented in a method for wireless communication by a user equipment (UE). The method generally includes receiving dynamic signaling from a network entity of an indication to activate or update a set of phase tracking reference signals (PTRS) parameters, and processing PTRS for at least one of a physical uplink shared channel (PUSCH) or a physical downlink shared channel (PDSCH), in accordance with the indication.

17 Claims, 13 Drawing Sheets

500

| Scheduled MCS | Time density($L_{PT-RS}$) |
|---|---|
| $I_{MCS} < ptrs - MCS_1$ | PT-RS is not present |
| $ptrs - MCS1\ I_{MCS} < ptrs - MCS2$ | 4 |
| $ptrs - MCS2\ I_{MCS} < ptrs - MCS3$ | 2 |
| $ptrs - MCS3\ I_{MCS} < ptrs - MCS4$ | 1 |

| Contiguous Scheduled BW | Frequency density($1/n$) |
|---|---|
| $N_{RB} < N_{RB0}$ | PT-RS is not present |
| $N_{RB0}\ N_{RB} < N_{RB1}$ | 2 |
| $N_{RB1}\ N_{RB}$ | 4 |

FIG. 6

Single-symbol DM-RS with two additional positions. PT-RS with $L_{PT-RS} = 2$

DYNAMIC PHASE TRACKING REFERENCE SIGNAL (PTRS) ACTIVATION

BACKGROUND

Field of the Disclosure

Aspects of the present disclosure relate to wireless communications, and more particularly, to techniques for dynamic phase tracking reference signal (PTRS) activation.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more BSs may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or a DU may communicate with a set of UEs on downlink channels (e.g., for transmissions from the BS or the DU to the UE) and uplink channels (e.g., for transmissions from the UE to the BS or the DU).

These multiple access technologies have been adopted in various telecommunication standards to provide a common protocol that enables different wireless devices to communicate on a municipal, national, regional, and even global level. The NR (e.g., new radio or 5G) is an example of an emerging telecommunication standard. The NR is a set of enhancements to the LTE mobile standard promulgated by 3GPP. The NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, the NR supports beamforming, multiple-input multiple-output (MIMO) antenna technology, and carrier aggregation.

However, as the demand for mobile broadband access continues to increase, there exists a need for further improvements in the NR and the LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved techniques using dynamic phase tracking reference signal (PTRS) activation.

Certain aspects of the subject matter described in this disclosure can be implemented in a method for wireless communications by a UE. The method generally includes receiving dynamic signaling from a network entity of an indication to activate or update a set of phase tracking reference signals (PTRS) parameters. The method generally includes processing PTRS for at least one of a physical uplink shared channel (PUSCH) or a physical downlink shared channel (PDSCH), in accordance with the indication.

Certain aspects of the subject matter described in this disclosure can be implemented in a method for wireless communication by a network entity. The method generally includes transmitting dynamic signaling to a user equipment (UE) of an indication to activate or update a set of phase tracking reference signals (PTRS) parameters. The method generally includes processing PTRS for at least one of a physical uplink shared channel (PUSCH) or a physical downlink shared channel (PDSCH), in accordance with the indication.

Certain aspects of the subject matter described in this disclosure can be implemented in a user equipment (UE). The UE generally includes a receiver configured to receive dynamic signaling from a network entity of an indication to activate or update a set of phase tracking reference signals (PTRS) parameters, and a processing system configured to process PTRS for at least one of a physical uplink shared channel (PUSCH) or a physical downlink shared channel (PDSCH), in accordance with the indication.

Certain aspects of the subject matter described in this disclosure can be implemented in a network entity. The network entity generally includes a transmitter configured to transmit dynamic signaling to a user equipment (UE) of an indication to activate or update a set of phase tracking reference signals (PTRS) parameters, and a processing system configured to process PTRS for at least one of a physical uplink shared channel (PUSCH) or a physical downlink shared channel (PDSCH), in accordance with the indication.

Aspects of the present disclosure provide UEs, network entities, means for, apparatuses, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 5 illustrates an example table of a time density of phase tracking reference signals (PTRSs) as a function of a scheduled modulation and coding scheme (MCS), in accordance with certain aspects of the present disclosure.

FIG. 6 illustrates an example table of a frequency density of PTRSs as a function of a scheduled bandwidth, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
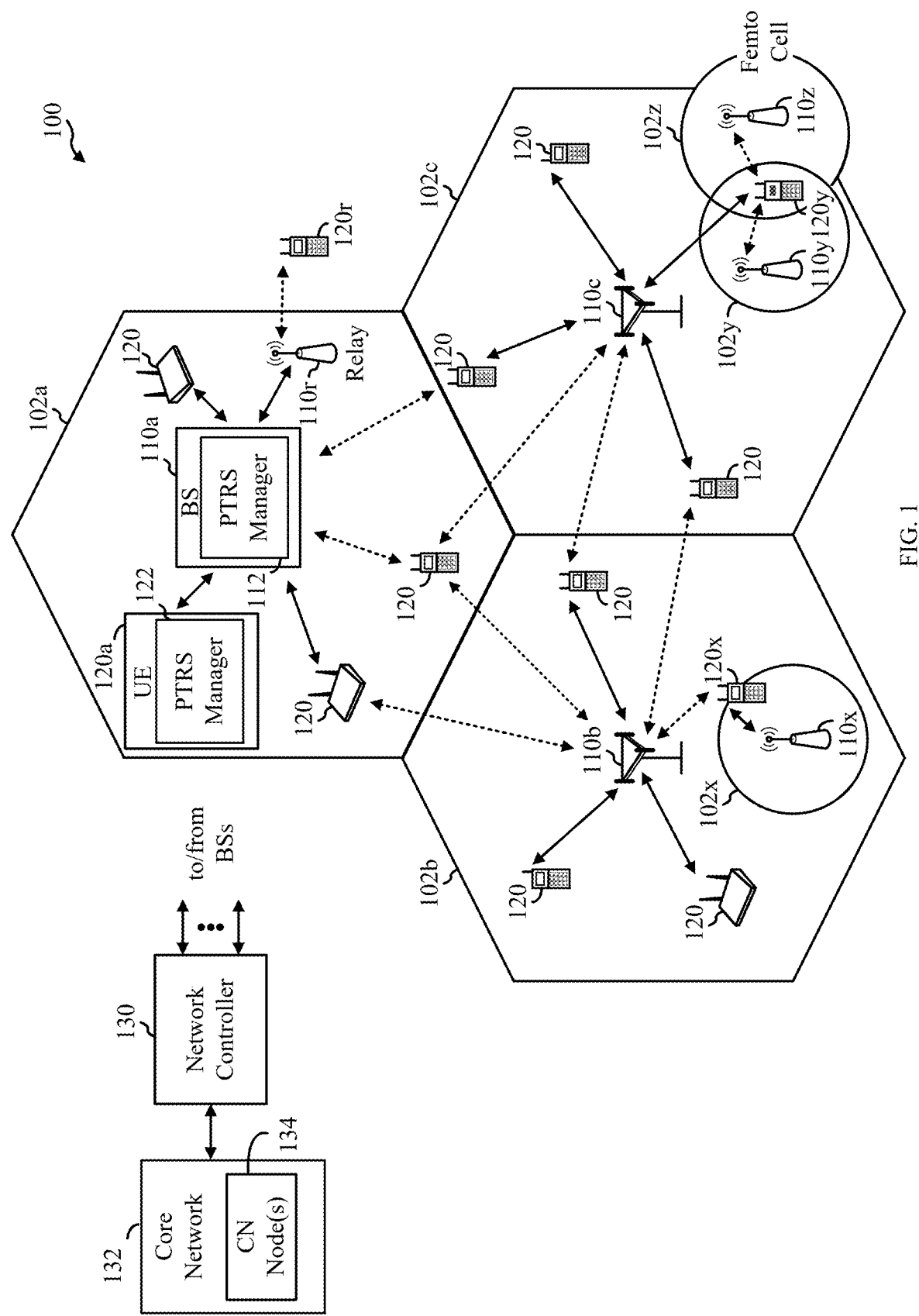
FIG. 1 is a block diagram conceptually illustrating an example wireless system, in accordance with certain aspects of the present disclosure.

Aspects of the present disclosure provide techniques for dynamic phase tracking reference signal (PTRS) aspect.

As will be described in greater detail below, a UE may be pre-configured with different sets of PTRS parameters. One of the sets of PTRS parameters may be activated dynamically, for example, via a DCI scheduling an uplink transmission (e.g., PUSCH) from the UE or a downlink transmission (e.g., PDSCH) to the UE. The uplink or downlink transmission may be sent with PTRS in accordance with the activated PTRS parameter set.

The following description provides examples of the techniques for dynamically activating PTRS, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G New Radio (NR)) wireless technologies, aspects of the present disclosure can be applied in other generation-based communication systems.

NR access may support various wireless communication services, such as enhanced mobile broadband (eMBB) targeting wide bandwidth, millimeter wave mmW, massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6

GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

Example Wireless Communications System

FIG. 1 illustrates an example wireless communication network 100 in which aspects of the present disclosure may be performed. For example, the wireless communication network 100 may include a UE 120a (with a PTRS manager 122) that may be configured to perform operations of FIG. 9. Similarly, the wireless communication network 100 may include a network entity, such as base station (BS) 110a (with a PTRS manager 112) that may be configured to perform operations of FIG. 10.

As shown in FIG. 1, the wireless communication network 100 may be in communication with a core network 132. The core network 132 may in communication with one or more base station (BSs) 110a-z (each also individually referred to herein as BS 110 or collectively as BSs 110) and/or user equipment (UE) 120a-y (each also individually referred to herein as UE 120 or collectively as UEs 120) in the wireless communication network 100 via one or more interfaces.

A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells.

The BSs 110 communicate with UEs 120 in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
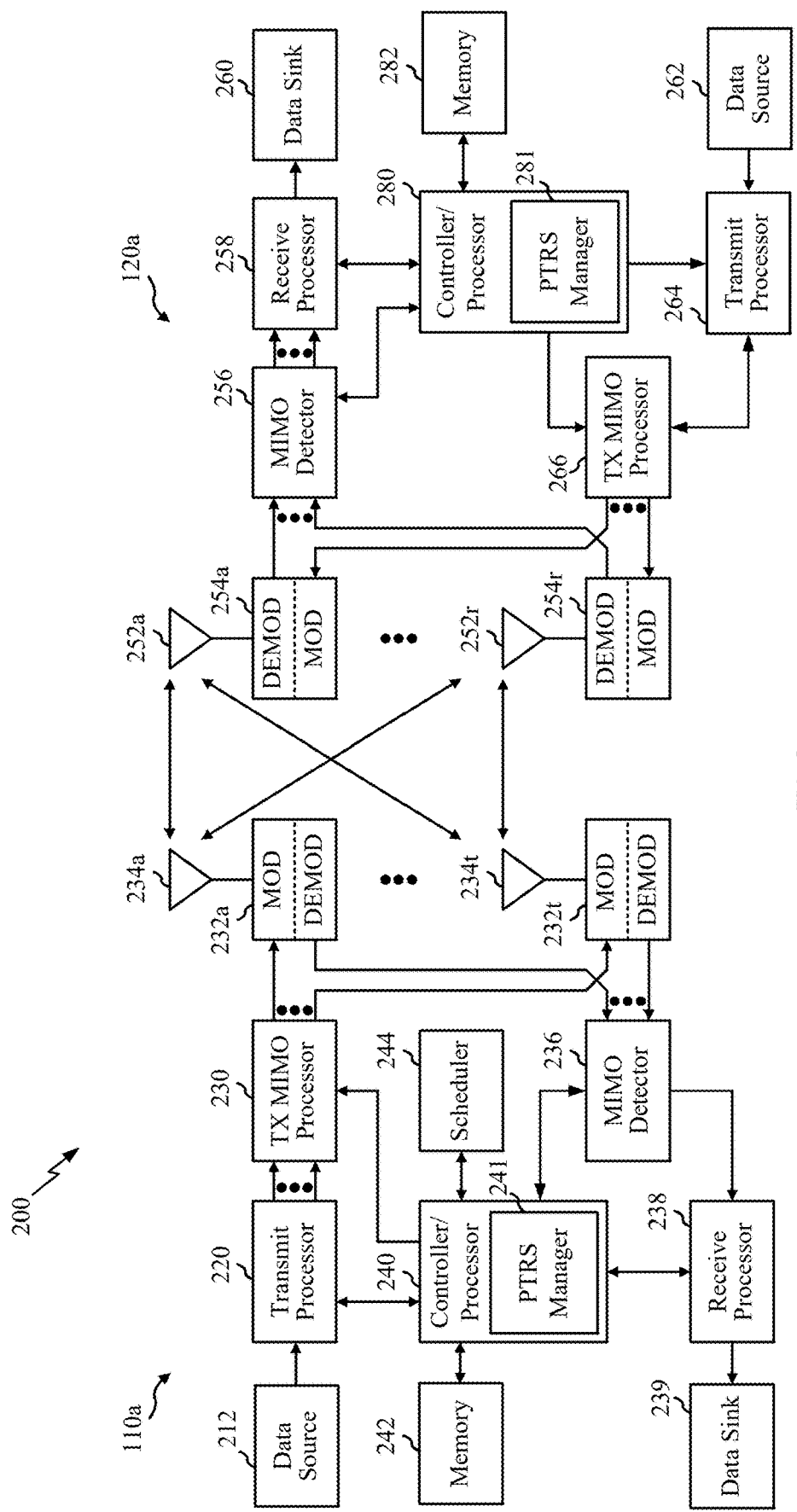
FIG. 2 illustrates example components of a network entity and a user equipment (UE), in accordance with certain aspects of the present disclosure.

FIG. 2 illustrates example components of BS 110a and UE 120a (e.g., the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the demodulators in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has a PTRS manager 241 that may be configured to perform operations of FIG. 10. As shown in FIG. 2, the controller/processor 280 of the UE 120a has a PTRS manager 281 configured to perform operations of FIG. 9. Although shown at the controller/processor, other components of the UE 120a and BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
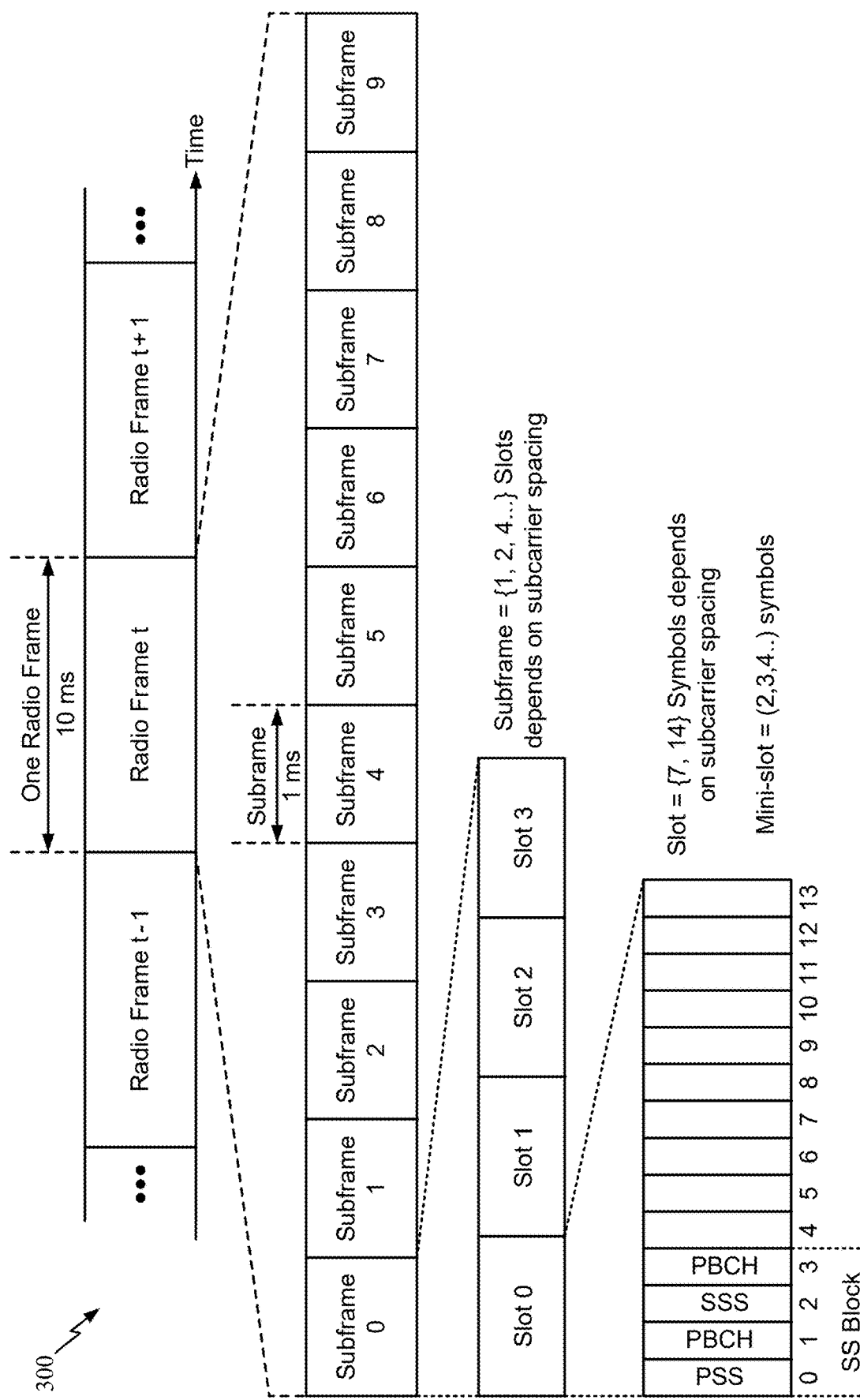
FIG. 3 is a block diagram is a diagram illustrating an example of a frame format for a new radio (NR), in accordance with certain aspects of the present disclosure.

FIG. 3 is a diagram showing an example of a frame format 300 for NR. The transmission timeline for each of DL and UL may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., the DL, the UL, or flexible) for data transmission and the link direction for each subframe may be dynamically switched. The link directions may be based on a slot format. Each slot may include DL/UL data as well as DL/UL control information.

In the NR, a SSB is transmitted. The SSB includes a PSS, a SSS, and a two symbol PBCH. The SSB can be transmitted in a fixed slot location, such as the symbols 0-3 as shown in FIG. 3. The PSS and the SSS may be used by UEs for cell search and acquisition. The PSS may provide half-frame timing, the SS may provide CP length and frame timing. The PSS and the SSS may provide cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs) such as system information block type 1 (SIB1), other system information (OSI) can be transmitted on a PDSCH in certain subframes. The SS block can be transmitted up to sixty-four times, for example, with up to sixty-four different beam directions for mmW. The up to sixty-four transmissions of the SS block are referred to as the SS burst set. The SS blocks in an SS burst set are transmitted in a same frequency region, while the SS blocks in different SS bursts sets can be transmitted at different frequency locations.

Example PTRS Design

In some wireless communication systems having a UE and a base station (BS), the BS may have a good phase coherence across its one or more antenna ports. The UE uplink transmission with two or more oscillators may be full-coherent, partial-coherent or non-coherent in phase. In such wireless communication systems, the PTRSs may be used for phase noise estimation. The PTRSs may track a phase of an oscillator at a transmitter and a receiver of the UE. The phase tracking may enable suppression of phase noise impacts such as common phase error (CPE), particularly at higher (e.g., mmWave) frequencies.

Figure 4:
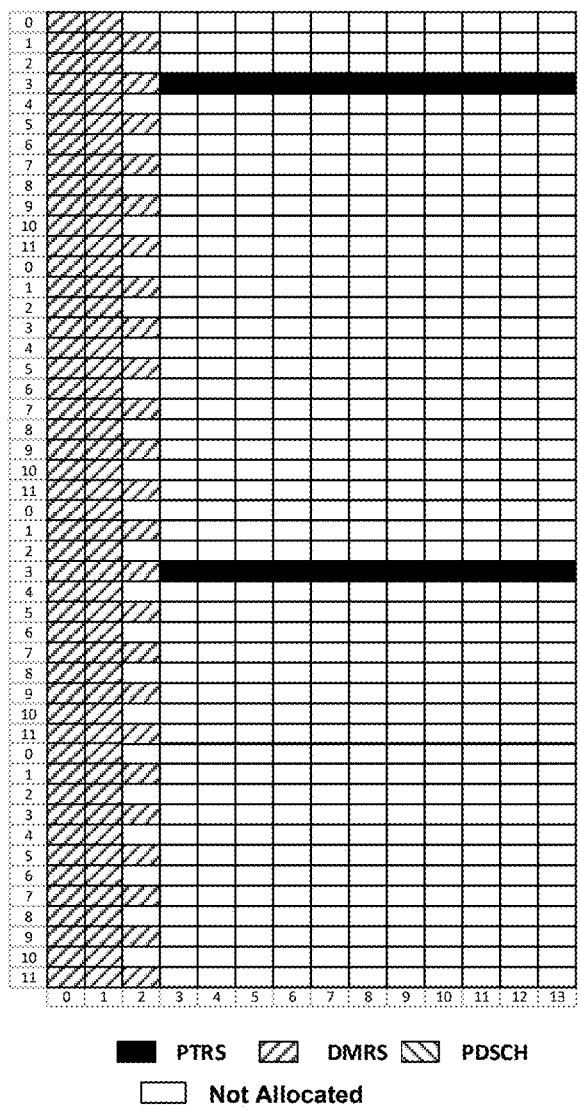
FIG. 4 illustrates example of PTRS tones in a resource block, in accordance with certain aspects of the present disclosure.

In a Rel-16 5G NR, the PTRS may be present in a resource block (as illustrated in a resource block 400 of FIG. 4). Time and frequency-domain resources for the PTRSs (PTRS tones) may be dynamically determined.

For single user multiple-input multiple-output (SU-MIMO), radio resource control (RRC) signaling may provide predefined configurations for the PTRS based on the time density (L=1 meaning PTRS occupies every one symbol) and the frequency density (K=2 meaning PTRS occupies two subcarriers), via PTRS-DownlinkConfig and PTRS-UplinkConfig. For example, the time density may be associated with and determined by a scheduled modulation and coding scheme (MCS), while the frequency density may be associated with and determined by a scheduled bandwidth (BW) (e.g., in number of RBs).

As shown in Table 500 of FIG. 5, the time density of PTRS may be determined as a function of scheduled MCS.

Time density determines whether the downlink PTRS is present or not, and also the time density of the DL PTRS. The parameter, such as timeDensity (LRRs) in the PTRS-DownlinkConfig and the PTRS-UplinkConfig, may indicate threshold values ptrs-MCSi, i=1, 2, 3, 4 as illustrated in Table 500 of FIG. 5.

As shown in Table 600 of FIG. 6, the frequency density of PTRS may be determined as a function of scheduled BW (e.g., in number of RBs). The parameter, such as frequencyDensity (1/n) in the PTRS-DownlinkConfig and the PTRS-UplinkConfig, may indicate threshold values NRB,i, i=0.1 as illustrated in Table 600 of FIG. 6.

For cyclic prefix orthogonal frequency-division multiplexing (CP-OFDM), the time density may include every symbol (L=1), every second symbol (L=2), or every fourth symbol (L=4). As the scheduled MCS increases, the time density of the PTRS is expected to increase, as well.

Further in CP-OFDM, the frequency density may include occupying at least one subcarrier in every resource block (RB), every second RB, or every fourth RB. The subcarrier may not necessarily be in all resource elements; however, this is dependent upon the corresponding time density. As the scheduled BW (e.g., in number of scheduled RBs) increases, the time density of the PTRS is expected to decrease.

Example Dynamic Phase Tracking Reference Signal (PTRS) Activation

As mentioned above, aspects of the present disclosure generally to improved techniques for efficiently using phase tracking reference signals (PTRSs).

Joint channel estimation (DMRS bundling) is one of the main topics for PUSCH and PUCCH coverage enhancement in NR R17. DMRS bundling may also be useful for PDSCH repetition. In many cases, the ability of a transmitter for maintaining phase continuity may depend on whether the PDSCH or PUSCH repetitions are contiguous or not (with or without a gap), or how the gap is used (e.g., in terms of the length or its usage, such as whether UL reception is done between the PDSCH repetitions).

If phase continuity is not perfect, it may be important for the receiver to be able to estimate phase jumps and compensate them. PTRS may be useful for this purpose. PTRS may also be useful in detecting and compensating frequency estimation error. Various challenges may exist that are related to how to facilitate usage of PTRS to allow a UE to be able to estimate phase jumps of PDSCH or PUSCH and compensate for them, or for other usage.

In some cases, PTRS may be used for phase tracking purposes. In LTE, other reference signals, such as cell-specific reference signal (CRS), may be used for phase tracking. However, there may be no equivalent of CRS in NR for phase tracking purposes.

Instead, PTRS may be embedded into the PDSCH or PUSCH (CP-OFDM and DFT-S-OFDM) resource allocation. PTRS may be activated, for example, when data channels are active for the given UE. Up to two ports may be configurable for DL PTRS and up to two ports may be configurable for UL PTRS. As described above with reference to FIGS. 4-6, presence and density of PTRS may depend on MCS and RB-allocation size. The RBs containing PTRS can be derived from the scheduled RBs and the associated frequency density (PTRS is not mapped to RBs that are not scheduled for the UE). For a given RB, if present, one PTRS port may be mapped on one subcarrier carrying one or more DMRS ports of the associated DMRS port group.

RRC signaling may be used to configure thresholds in density tables. For example, a UE may be configured with two sets of thresholds M={ptrsthMCS$_j$, j=1, 2, 3, 4} and R={ptrsthRB$_n$, n=0, 2, 4}, independently per BWP, using dedicated RRC signaling for UL and DL respectively. In some cases, a UE may signal its capability (or preference) for certain thresholds. For example, at a given carrier frequency, for each subcarrier spacing applicable to a data channel at this carrier frequency, a UE may report a preferred MCS/BW thresholds, for example, based on its phase noise characteristics, assuming the MCS table with the maximum ModOrder as it reported to support.

When PTRS is present (e.g., DL-PTRS-present and/or UL-PTRS-present is enabled), one PTRS port may be present in every OFDM symbol and every second RB unless DL/UL density tables are configured by RRC. As described above with reference to FIGS. 5 and 6, for single user MIMO (SU-MIMO), there may be a predefined and RRC-configured association between PTRS (time and frequency) densities and scheduled MCS/BW. The time density of PTRS may be expected to increase with increasing the scheduled MCS (e.g., except for those reserved MCSs). The frequency density of PTRS may be expected to decrease with increasing the scheduled BW (e.g., the number of scheduled RBs).

Figure 7:
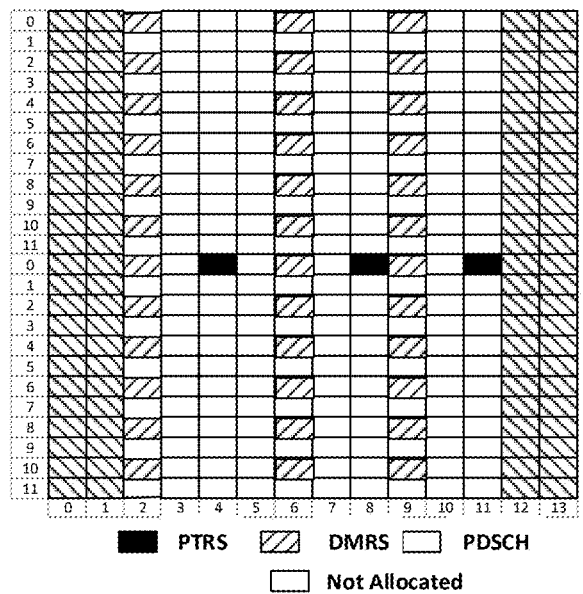
FIG. 7 illustrates an example of PTRS tones in resource blocks, in accordance with certain aspects of the present disclosure.
Figure 8:
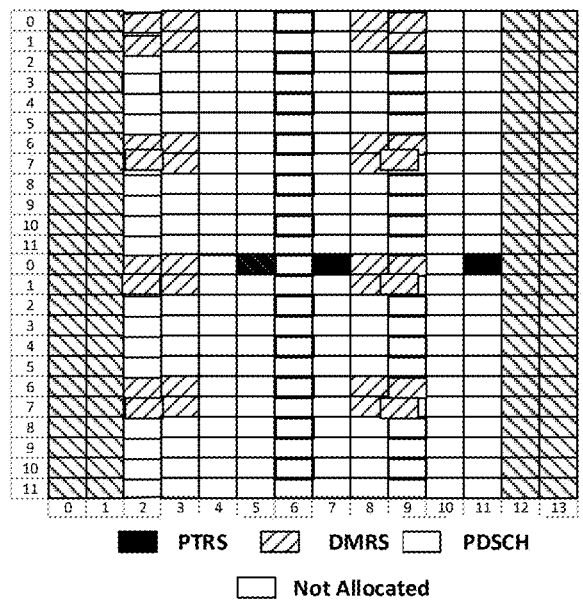
FIG. 8 illustrates another example of PTRS tones in resource blocks, in accordance with certain aspects of the present disclosure.

The PTRS signal applicable to the CP-OFDM waveform does not typically have its own scrambling, but is simply a repetition of one of the DM-RS signals within the data channel (e.g., a repetition of a subset of the DM-RS REs of one DM-RS port). The modulation values of the first DM-RS symbol before applying the Walsh orthogonal cover code (OCC) may be repeated. As illustrated in the examples shown in FIGS. 7 and 8, in an OFDM symbol containing DM-RS, PTRS is typically not inserted, but the DM-RS observation may be used instead for phase noise estimation. The symbol counting for time domain density may be reset at every DM-RS symbol.

Aspects of the present disclosure may help increase performance, for example, by allowing the flexibility to update PTRS configurations with dynamic PTRS set activation (or updating). For example, a gNB may activate or update parameters of PTRS (for PUSCH or PDSCH), using dynamic signaling. In some cases, a UE may be configured with multiple sets of PTRS parameters (e.g., corresponding to different thresholds for determining time and/or frequency densities) and one of the PTRS parameters sets may be dynamically activated. This dynamic activation may allow PTRS density to be dynamically adapted to enhance phase noise estimation, when appropriate.

Figure 9:
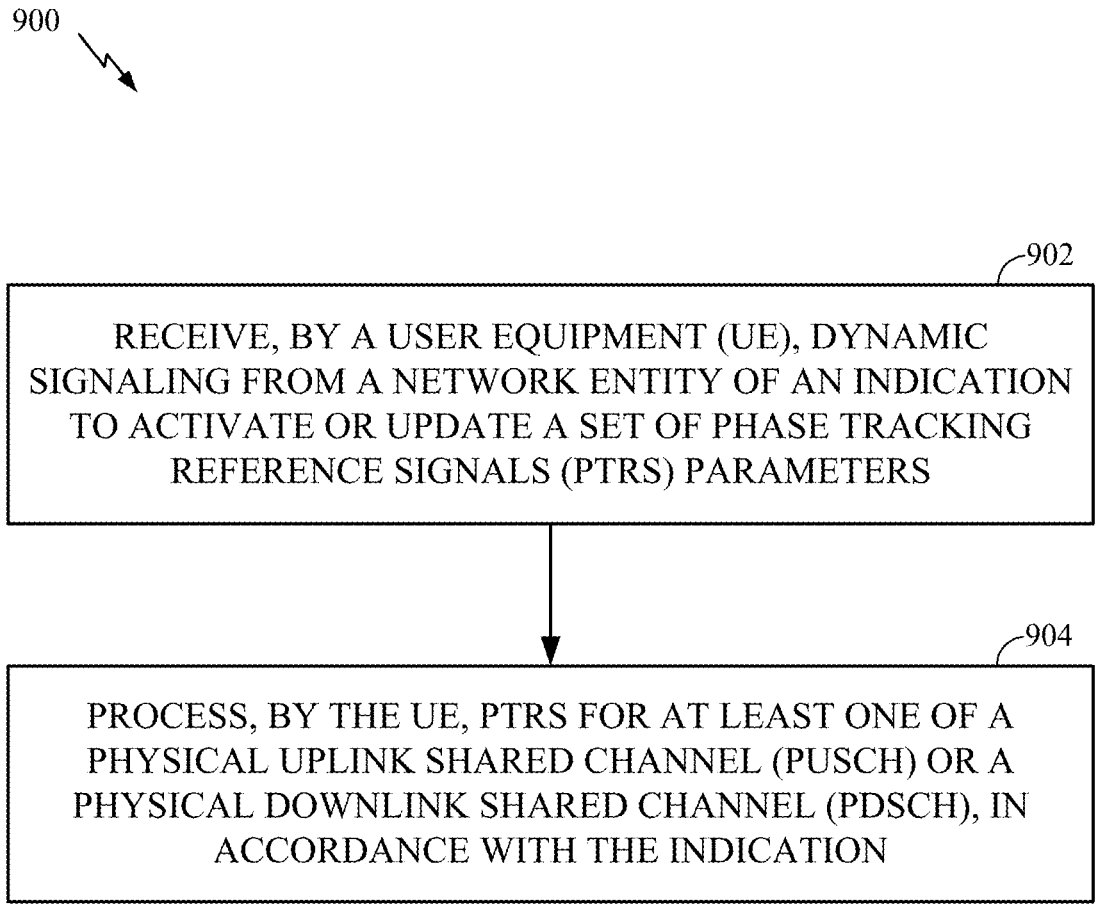
FIG. 9 illustrates example operations for wireless communication by a UE, in accordance with certain aspects of the present disclosure.

FIG. 9 is a flow diagram illustrating example operations 900 for wireless communication by a UE, in accordance with certain aspects of the present disclosure. The operations 900 may be performed, for example, by a UE (e.g., such as the UE 120*a* in the wireless communication network 100). The operations 900 may be implemented as software components that are executed and run on one or more processors (e.g., controller/processor 280 of FIG. 2). Further, the transmission and reception of signals by the UE in operations 900 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

Operations 900 begin, at 902, by receiving dynamic signaling from a network entity of an indication to activate or update a set of phase tracking reference signals (PTRS) parameters.

At 904, the UE processes PTRS for at least one of a physical uplink shared channel (PUSCH) or a physical downlink shared channel (PDSCH), in accordance with the indication.

Figure 10:
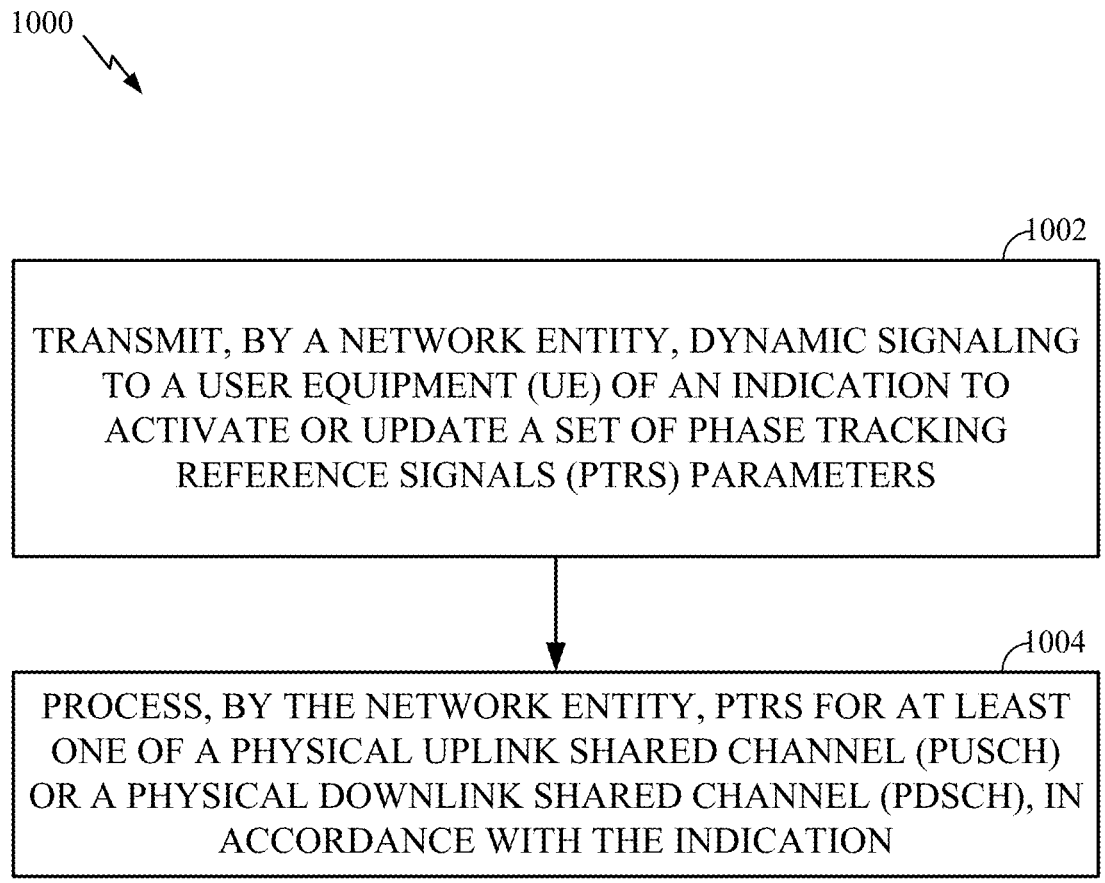
FIG. 10 illustrates example operations for wireless communication by a network entity, in accordance with certain aspects of the present disclosure.

FIG. 10 is a flow diagram illustrating example operations 1000 that may be considered complementary to operations 900 of FIG. 9. For example, operations 1000 may be performed by a network entity (e.g., such as the BS 110a in the wireless communication network 100) to dynamically signal an activation or update to a PTRS parameter set to a UE performing operations 900 of FIG. 9. The operations 1000 may be implemented as software components that are executed and run on one or more processors (e.g., controller/processor 240 of FIG. 2). Further, the transmission and reception of signals by the BS in operations 1000 may be enabled, for example, by one or more antennas (e.g., antennas 234 of FIG. 2). In certain aspects, the transmission and/or reception of signals by the network entity may be implemented via a bus interface of one or more processors (e.g., controller/processor 240) obtaining and/or outputting signals.

Operations 1000 begin, at 1002, by transmitting dynamic signaling to a user equipment (UE) of an indication to activate or update a set of phase tracking reference signals (PTRS) parameters.

At 1004, the network entity processes PTRS for at least one of a physical uplink shared channel (PUSCH) or a physical downlink shared channel (PDSCH), in accordance with the indication.

Figure 11:
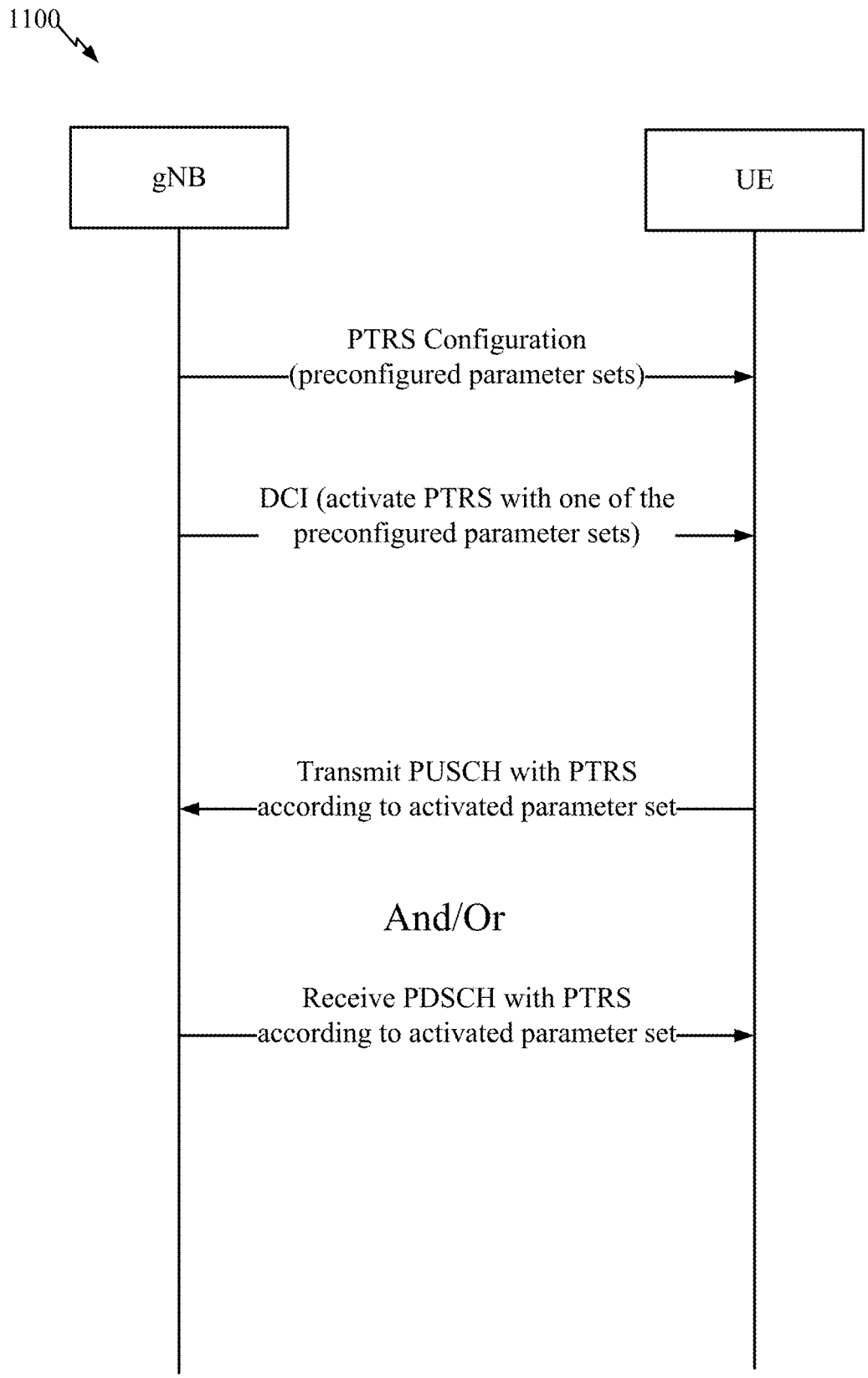
FIG. 11 is a call flow diagram illustrating dynamic PTRS activation in uplink transmissions, in accordance with certain aspects of the present disclosure.
Figure 12:
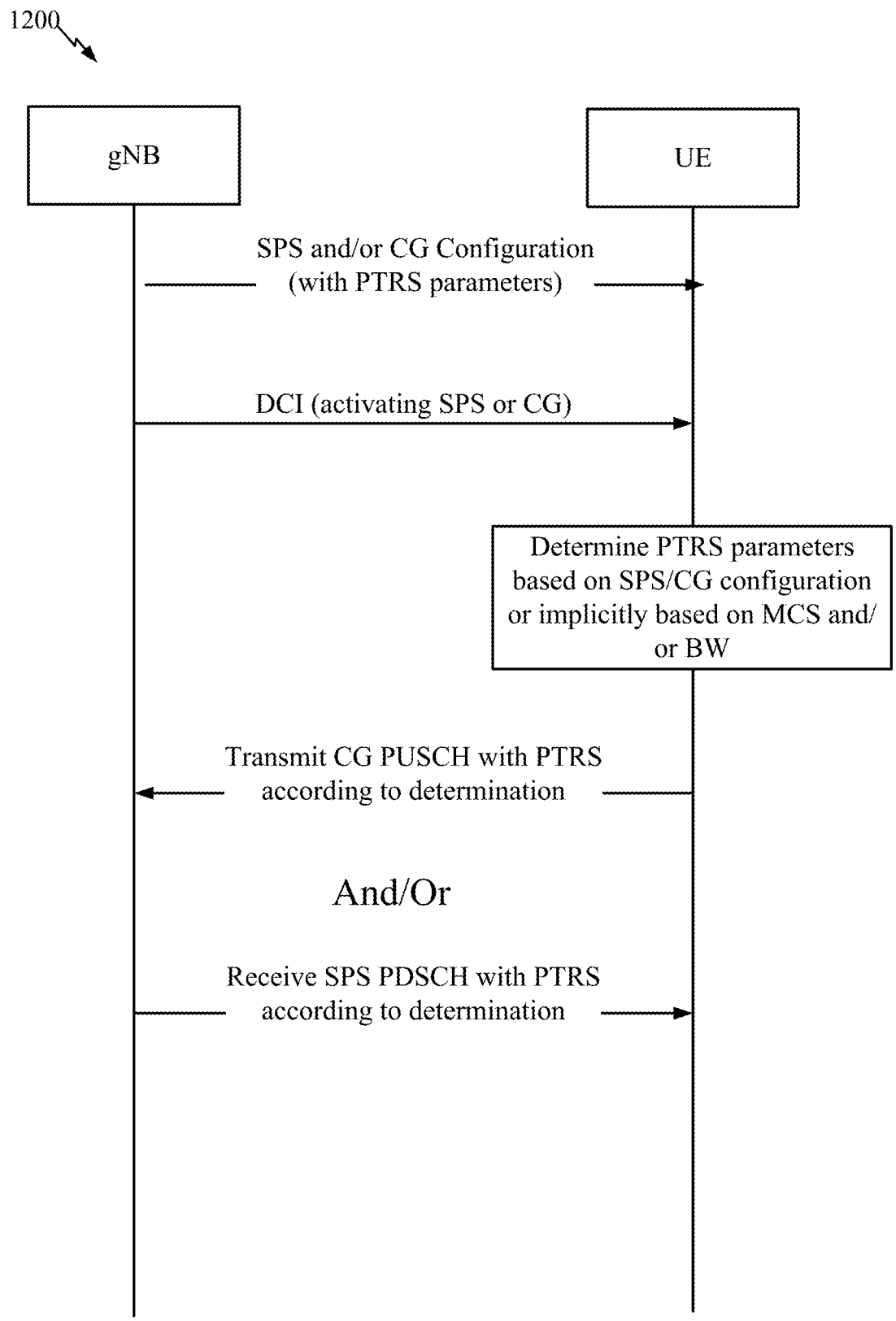
FIG. 12 is a call flow diagram illustrating dynamic PTRS activation in uplink transmissions, in accordance with certain aspects of the present disclosure.

Operations of FIGS. 9 and 10 may be understood with references to the call flow diagrams 1100 and 1200 of FIGS. 11 and 12.

Referring first to FIG. 11, as illustrated, a gNB may configure (pre-configure) a UE with multiple PTRS parameter sets. In some cases, each PTRS parameter set may include a first threshold for determining at least one of a time density or presence of PTRS for the PDSCH or PUSCH and/or a second threshold for determining at least one of a frequency density or presence of PTRS.

The gNB may then activate or update parameters of PTRS (for PUSCH or PDSCH), using dynamic signaling. In the illustrated example, the gNB sends a DCI that activates one of the PTRS parameter sets.

The DCI may dynamically schedule a PUSCH transmission or activate a configured grant (CG) PUSCH, in which case, the UE may transmit the PUSCH with PTRS according to the activated PTRS parameter set. As an alternative, The DCI may dynamically schedule a PDSCH transmission or activate a semi-persistently scheduled (SPS) PDSCH, in which case, the UE may receive (monitor for) a PDSCH from the gNB with PTRS according to the activated PTRS parameter set.

In this manner, PTRS presence and/or some part of the PTRS parameters may be indicated by the scheduling DCI for a scheduled PDSCH or by a DCI that provides dynamic grant for PUSCH. As shown, the gNB may configure different sets of thresholds {ptrs-MCS1, ptrs-Mcs2, ptrs-Mcs3} for determination of time density of PTRS and/or its presence in PDSCH and/or PUSCH and indicate one of the sets by dynamic signaling. In some cases, the indication (activated set) may be valid until another dynamic indication overrides it.

Similarly, the gNB may configure different sets of {N_RB0, N_RB1} for determination of frequency density of PTRS and/or its presence in PDSCH and/or PUSCH, and indicate one by dynamic signaling. Again, the indication may be valid until another dynamic indication overrides it.

As illustrated in FIG. 12, in some cases, a PTRS parameter set may be activated via a DCI activating an SPS (PDSCH) transmission that indicates PTRS presence or part of its parameters. In this case, the PTRS parameters (e.g. time and frequency density) may be configured as part of an SPS configuration. As an alternative, or in addition, the PTRS parameters may be implicitly determined based on MCS and/or bandwidth. In this case, the UE receives the SPS PDSCH with PTRS transmitted according to the determined PTRS parameters.

In some cases, a DCI activating (a Type 2) configured grant (CG) may indicate PTRS presence or part of its parameters. The parameters (e.g. time and frequency density) may be configured as part of CG configuration. As an alternative, or in addition, the PTRS parameters may be implicitly determined based on MCS and/or bandwidth. In this case, the UE transmits the CG PUSCH with PTRS according to the determined PTRS parameters.

Figure 13:
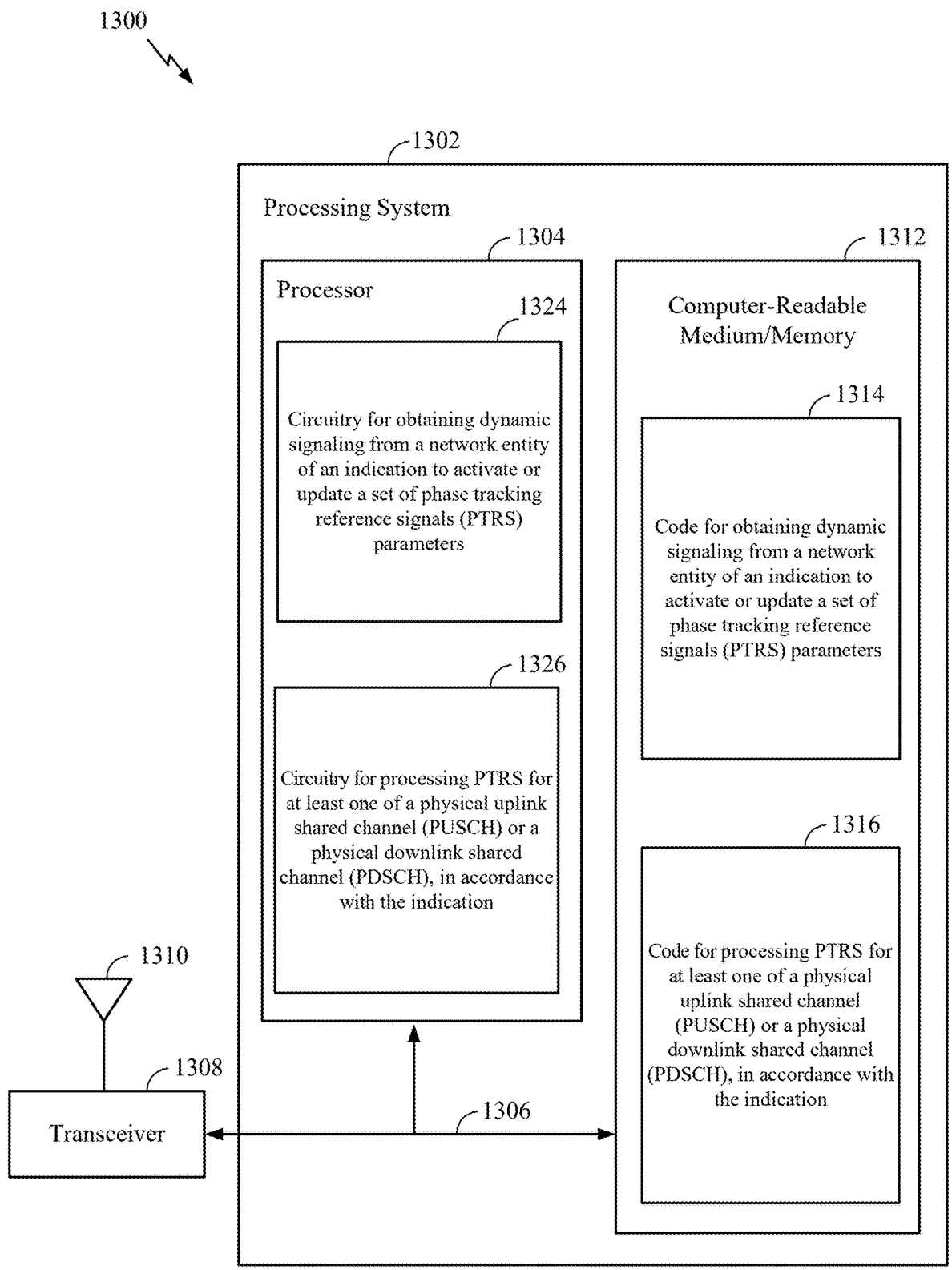
FIG. 13 illustrates a communications device that may include various components configured to perform operations for techniques disclosed herein, in accordance with aspects of the present disclosure.

FIG. 13 illustrates an example communications device 1300 that may include various components (e.g., corresponding to means-plus-function components) configured to perform operations for the techniques disclosed herein. For example, the device 1300 may be a UE configured to perform operations illustrated in FIG. 9. The communications device 1300 includes a processing system 1302 coupled to a transceiver 1308 (e.g., a transmitter and/or a receiver). The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions (e.g., computer-executable code) that when executed by the processor 1304, cause the processor 1304 to perform the operations illustrated in FIG. 9, or other operations for performing the various techniques discussed herein. In certain aspects, computer-readable medium/memory 1312 stores code 1314 for obtaining (that may be used to perform the various receiving operations of FIG. 9); and code 1316 for processing (that may be used to perform the various processing operations of FIG. 9), etc. In certain aspects, the processor 1304 has circuitry configured to implement the code stored in the computer-readable medium/memory 1312. The processor 1304 includes circuitry 1324 for obtaining (that may be used to perform the various receiving operations of FIG. 9); and circuitry 1326 for processing (that may be used to perform the various processing operations of FIG. 9), etc.

Figure 14:
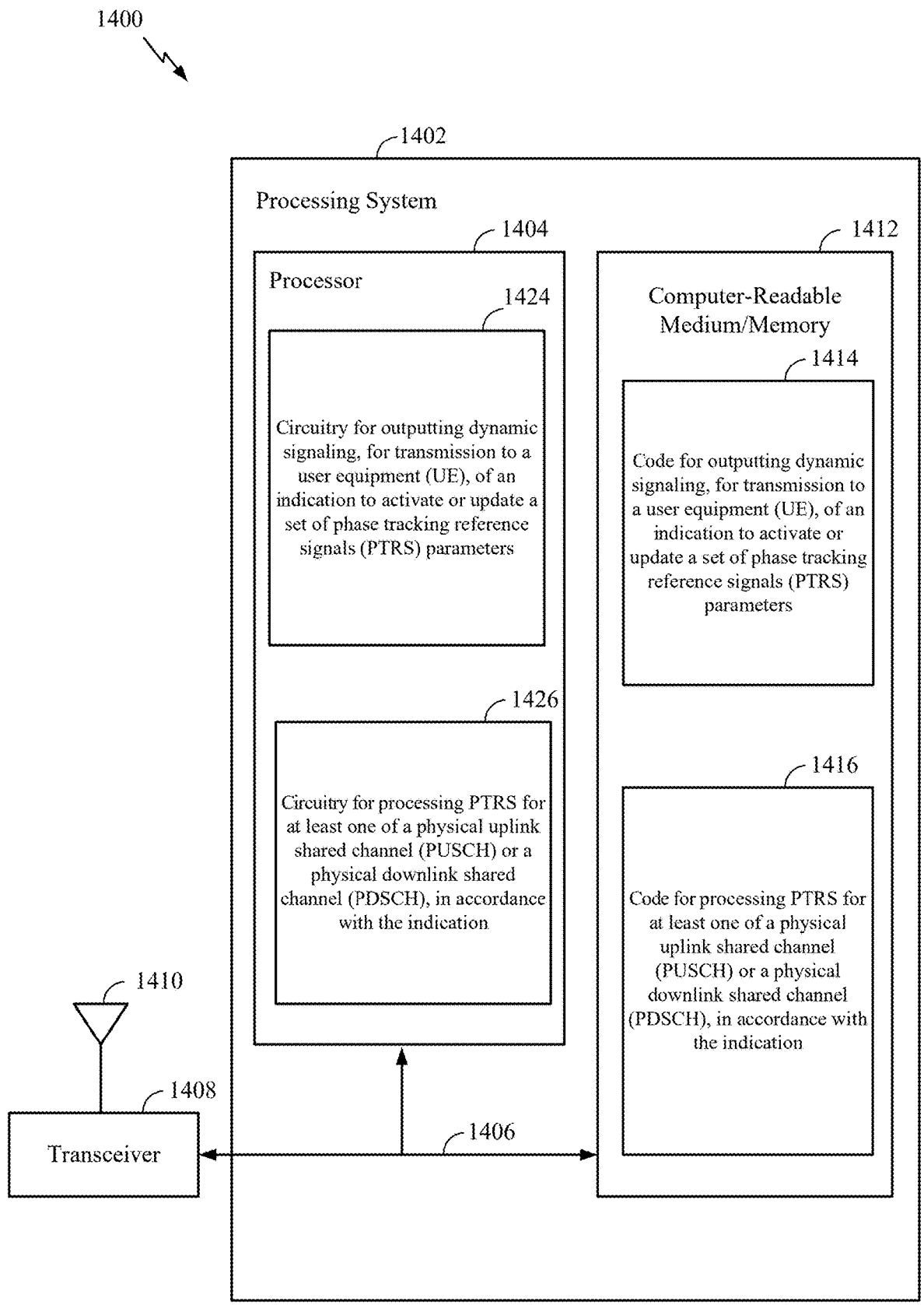
FIG. 14 illustrates a communications device that may include various components configured to perform operations for techniques disclosed herein, in accordance with aspects of the present disclosure.

FIG. 14 illustrates an example communications device 1400 that may include various components (e.g., corresponding to means-plus-function components) configured to perform operations for the techniques disclosed herein. For example, the device 1400 may be a network entity configured to perform operations illustrated in FIG. 10. The communications device 1400 includes a processing system 1402 coupled to a transceiver 1408 (e.g., a transmitter and/or a receiver). The transceiver 1408 is configured to transmit and receive signals for the communications device 1400 via an antenna 1410, such as the various signals as described herein. The processing system 1402 may be configured to perform processing functions for the communications device 1400, including processing signals received and/or to be transmitted by the communications device 1400.

The processing system 1402 includes a processor 1404 coupled to a computer-readable medium/memory 1412 via a bus 1406. In certain aspects, the computer-readable medium/memory 1412 is configured to store instructions (e.g., computer-executable code) that when executed by the processor 1404, cause the processor 1404 to perform the operations illustrated in FIG. 10, or other operations for performing the various techniques discussed herein. In certain aspects, computer-readable medium/memory 1412 stores code 1414 for outputting (that may be used to perform the various transmitting operations of FIG. 10); code 1416 for processing (that may be used to perform the various processing operations of FIG. 10), etc. In certain aspects, the processor 1404 has circuitry configured to implement the code stored in the computer-readable medium/memory 1412. The processor 1404 includes circuitry 1424 for outputting (that may be used to perform the various transmitting operations of FIG. 10); circuitry 1426 for processing (that may be used to perform the various processing operations of FIG. 10), etc.

Example Aspects

Aspect 1: A method for wireless communications by a user equipment (UE), comprising: receiving dynamic signaling from a network entity of an indication to activate or update a set of phase tracking reference signals (PTRS) parameters; and processing PTRS for at least one of a physical uplink shared channel (PUSCH) or a physical downlink shared channel (PDSCH), in accordance with the indication.

Aspect 2: The method of Aspect 1, wherein the set of PTRS parameters comprises at least one of: a first threshold for determining at least one of a time density or presence of PTRS for the PDSCH or PUSCH; or a second threshold for determining at least one of a frequency density or presence of PTRS.

Aspect 3: The method of any one of Aspects 1-2, wherein: the dynamic signaling activates a PTRS parameter set, from a plurality of PTRS parameters sets configured for the UE, each PTRS parameters set having one or more PTRS parameters.

Aspect 4: The method of Aspect 3, further comprising receiving radio resource control (RRC) configuring the UE with the plurality of PTRS parameter sets.

Aspect 5: The method of any one of Aspects 1-4, wherein the dynamic signaling comprises a downlink control information (DCI) that schedules the PDSCH.

Aspect 6: The method of any one of Aspects 1-5, wherein the dynamic signaling comprises a downlink control information (DCI) that provides a dynamic grant for the PUSCH.

Aspect 7: The method of any one of Aspects 1-6, wherein the UE processes PTRS according to the indication until the UE receives another indication to activate or update a set of PTRS parameters.

Aspect 8: The method of any one of Aspects 1-7, wherein the dynamic signaling comprises a downlink control information (DCI) that activates a semi-persistently scheduled (SPS) transmission.

Aspect 9: The method of Aspect 8, wherein the indication activates or updates a set of PTRS parameters that is at least one of: configured as part of an SPS configuration; or determined based on a modulation and coding scheme (MCS) or bandwidth for the SPS transmission.

Aspect 10: The method of any one of Aspects 1-9, wherein the dynamic signaling comprises a downlink control information (DCI) that activates a configured grant (CG) transmission.

Aspect 11: The method of Aspect 10, wherein the indication activates or updates a set of PTRS parameters that is at least one of: configured as part of a CG configuration; or determined based on a modulation and coding scheme (MCS) or bandwidth for the CG transmission.

Aspect 12: The method of any one of Aspects 1-11, wherein the dynamic signaling comprises a medium access control (MAC) control element (CE).

Aspect 13: The method of any one of Aspects 1-12, further comprising indicating, to the network entity, a capability of the UE to support dynamic signaling of indications to activate or update PTRS parameter sets.

Aspect 14: A method for wireless communications by a network entity, comprising: transmitting dynamic signaling to a user equipment (UE) of an indication to activate or update a set of phase tracking reference signals (PTRS) parameters; and processing PTRS for at least one of a physical uplink shared channel (PUSCH) or a physical downlink shared channel (PDSCH), in accordance with the indication.

Aspect 15: The method of Aspect 14, wherein the set of PTRS parameters comprises at least one of: a first threshold for determining at least one of a time density or presence of PTRS for the PDSCH or PUSCH; or a second threshold for determining at least one of a frequency density or presence of PTRS.

Aspect 16: The method of any one of Aspects 14-15, wherein: the dynamic signaling activates a PTRS parameter set, from a plurality of PTRS parameters sets configured for the UE, each PTRS parameters set having one or more PTRS parameters.

Aspect 17: The method of Aspect 16, further comprising transmitting radio resource control (RRC) configuring the UE with the plurality of PTRS parameter sets.

Aspect 18: The method of any one of Aspects 14-17, wherein the dynamic signaling comprises a downlink control information (DCI) that schedules the PDSCH.

Aspect 19: The method of any one of Aspects 14-18, wherein the dynamic signaling comprises a downlink control information (DCI) that provides a dynamic grant for the PUSCH.

Aspect 20: The method of any one of Aspects 14-19, wherein the network entity processes PTRS according to the indication until the network entity signals the UE another indication to activate or update a set of PTRS parameters.

Aspect 21: The method of any one of Aspects 14-20, wherein the dynamic signaling comprises a downlink control information (DCI) that activates a semi-persistently scheduled (SPS) transmission.

Aspect 22: The method of Aspect 21, wherein the indication activates or updates a set of PTRS parameters that is at least one of: configured as part of an SPS configuration; or determined based on a modulation and coding scheme (MCS) or bandwidth for the SPS transmission.

Aspect 23: The method of any one of Aspects 14-22, wherein the dynamic signaling comprises a downlink control information (DCI) that activates a configured grant (CG) transmission.

Aspect 24: The method of Aspect 23, wherein the indication activates or updates a set of PTRS parameters that is at least one of: configured as part of a CG configuration; or determined based on a modulation and coding scheme (MCS) or bandwidth for the CG transmission.

Aspect 25: The method of any one of Aspects 14-24, wherein the dynamic signaling comprises a medium access control (MAC) control element (CE).

Aspect 26: The method of any one of Aspects 14-25, further comprising receiving, from the UE, an indication of a capability of the UE to support dynamic signaling of indications to activate or update PTRS parameter sets.

Aspect 27: A user equipment, comprising means for performing the operations of one or more of Aspects 1-13.

Aspect 28: A user equipment, comprising a transceiver and a processing system including at least one processor configured to perform the operations of one or more of Aspects 1-13.

Aspect 29: An apparatus for wireless communications by a user equipment (UE), comprising: an interface configured to obtain dynamic signaling from a network entity of an indication to activate or update a set of phase tracking reference signals (PTRS) parameters; and a processing system configured to process PTRS for at least one of a physical uplink shared channel (PUSCH) or a physical downlink shared channel (PDSCH), in accordance with the indication.

Aspect 30: A computer-readable medium wireless communications by a user equipment (UE), comprising codes executable by an apparatus to: obtain dynamic signaling from a network entity of an indication to activate or update a set of phase tracking reference signals (PTRS) parameters; and process PTRS for at least one of a physical uplink shared channel (PUSCH) or a physical downlink shared channel (PDSCH), in accordance with the indication.

Aspect 31: A network entity, comprising means for performing the operations of one or more of Aspects 1-13.

Aspect 32: A network entity, comprising a transceiver and a processing system including at least one processor configured to perform the operations of one or more of Aspects 1-13.

Aspect 33: An apparatus for wireless communications by a network entity, comprising: an interface configured to output dynamic signaling, for transmission to a user equipment (UE), of an indication to activate or update a set of phase tracking reference signals (PTRS) parameters; and a processing system configured to process PTRS for at least one of a physical uplink shared channel (PUSCH) or a physical downlink shared channel (PDSCH), in accordance with the indication.

Aspect 34: A computer-readable medium wireless communications by a network entity, comprising codes executable by an apparatus to: output dynamic signaling, for transmission to a user equipment (UE), of an indication to activate or update a set of phase tracking reference signals (PTRS) parameters; and process PTRS for at least one of a physical uplink shared channel (PUSCH) or a physical downlink shared channel (PDSCH), in accordance with the indication.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

Means for configuring may include a processor (e.g., the controller/processor 380) and/or circuitry for configuring (e.g., the circuitry for configuring 1520). Means for transmitting may include an antenna (e.g., the antennas 352a-352r), a transceiver (e.g., the transceivers 354a-354r), a processor (e.g., the controller/processor 380), and/or circuitry for outputting (e.g., the circuitry for outputting 1522). In certain aspects, various processors and/or various circuitry may include a circuit, a CPU, a GPU, a DSP, an ASIC, a FPGA, or other PLD, discrete gate or transistor logic, discrete hardware components, or any combination thereof designed to perform the functions described herein.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/ device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices. In addition, the wireless node can be configured as a UE or a BS.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, a digital signal processor (DSP), an application specific integrated circuit (ASIC), or a processor (e.g., a general purpose or specifically programmed processor). Generally, where there are operations illustrated in figures, those operations may have corresponding counterpart means-plus-function components with similar numbering. For example, processors 258, 264 and 266, and/or controller/processor 280 of the UE 120a shown in FIG. 2 may be configured to perform operations 900 of FIG. 9 and processors 220, 230, 238, and/or controller/processor 240 of the BS 110a shown in FIG. 2 may be configured to perform operations 1000 of FIG. 10.

Means for receiving may include a transceiver, a receiver or at least one antenna and at least one receive processor illustrated in FIG. 2. Means for transmitting, means for sending or means for outputting may include, a transceiver, a transmitter or at least one antenna and at least one transmit processor illustrated in FIG. 2. Means for determining, means for indicating, and means for processing may include a processing system, which may include one or more processors, such as processors 258, 264 and 266, and/or controller/processor 280 of the UE 120a and/or processors 220, 230, 238, and/or controller/processor 240 of the BS 110a shown in FIG. 2.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 9 and 10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A user equipment (UE), comprising:
one or more memories; and
one or more processors coupled to the one or more memories and configured, individually or collectively, to:
receive dynamic signaling from a network entity having a first indication that indicates an activation of a presence of phase tracking reference signals (PTRS) in a physical downlink shared channel (PDSCH),
wherein the UE is preconfigured with a plurality of PTRS parameter sets independently per bandwidth part (BWP), each PTRS parameter including a first threshold for determining a time density of the PTRS and a second threshold for determining a frequency density of the PTRS, and wherein the dynamic signaling is a downlink control information (DCI) that further indicates PTRS parameters of a first PTRS parameter set from the plurality of PTRS parameters sets configured for the UE; and process the PTRS in accordance with the first indication until a new indication is received corresponding to a second PTRS parameter set from the plurality of PTRS parameters sets.

2. The UE of claim 1, the dynamic signaling activates the first PTRS parameter set, from the plurality of PTRS parameters sets, each PTRS parameter set having one or more PTRS parameters.

3. The UE of claim 1, wherein the dynamic signaling indicates an update to the PTRS parameters, the update based on a PTRS parameter set from the plurality of PTRS parameter sets.

4. The UE of claim 1, wherein the dynamic signaling schedules the PDSCH.

5. The UE of claim 1, wherein the dynamic signaling activates a semi-persistently scheduled (SPS) transmission.

6. The UE of claim 1, wherein the dynamic signaling activates a configured grant (CG) transmission.

7. The UE of claim 1, wherein the dynamic signaling further comprises a medium access control (MAC) control element (CE).

8. A method for wireless communications by a user equipment (UE), comprising:
receiving dynamic signaling from a network entity having a first indication that indicates an activation of a presence of phase tracking reference signals (PTRS) in a physical downlink shared channel (PDSCH), wherein the UE is preconfigured with a plurality of PTRS parameter sets independently per bandwidth part (BWP), each PTRS parameter including a first threshold for determining a time density of the PTRS and a second threshold for determining a frequency density of the PTRS, and wherein the dynamic signaling is a downlink control information (DCI) that further indicates PTRS parameters of a first PTRS parameter set from a plurality of PTRS parameters sets configured for the UE; and processing the PTRS in accordance with the first indication until a new indication is received corresponding to a second PTRS parameter set from the plurality of PTRS parameters sets.

9. The method of claim 8, wherein the set of PTRS parameters of the first PTRS parameter set comprises at least one of:
a first threshold for determining at least one of a time density or presence of the PTRS for the PDSCH or PUSCH; or
a second threshold for determining at least one of a frequency density or presence of the PTRS.

10. The method of claim 8, wherein:
the dynamic signaling activates the PTRS parameter set, from the plurality of PTRS parameters sets configured for the UE, each PTRS parameter set having one or more PTRS parameters.

11. The method of claim 8, wherein the dynamic signaling schedules the PDSCH.

12. The method of claim 8, wherein the dynamic signaling activates a semi-persistently scheduled (SPS) transmission.

13. The method of claim 12, wherein the first indication activates or updates the set of PTRS parameters of the first PTRS parameter set based on an SPS configuration.

14. The method of claim 8, wherein the dynamic signaling activates a configured grant (CG) transmission.

15. The method of claim 14, wherein the first indication activates or updates the set of PTRS parameters of the first PTRS parameter set based on a CG configuration.

16. The method of claim 8, wherein the dynamic signaling further comprises a medium access control (MAC) control element (CE).

17. The method of claim 8, further comprising indicating, to the network entity, a capability of the UE to support dynamic signaling of indications to activate or update one or more of the plurality of PTRS parameter sets.

* * * * *